US 8,160,919 B2

(12) United States Patent
Smith

(10) Patent No.: US 8,160,919 B2
(45) Date of Patent: Apr. 17, 2012

(54) SYSTEM AND METHOD OF DISTRIBUTING AUDIO CONTENT

(75) Inventor: Charles Eric Smith, Austin, TX (US)

(73) Assignee: UnWired Nation, Austin, TX (US)

( * ) Notice: Subject to any disclaimer, the term of this patent is extended or adjusted under 35 U.S.C. 154(b) by 932 days.

(21) Appl. No.: 12/053,422

(22) Filed: Mar. 21, 2008

(65) Prior Publication Data

US 2009/0240540 A1 Sep. 24, 2009

(51) Int. Cl.
*G06Q 99/00* (2006.01)

(52) U.S. Cl. .......................................... 705/7.35; 705/1.1

(58) Field of Classification Search .................... 705/1.1, 705/14, 52, 400; 704/258, 260; 706/16
See application file for complete search history.

(56) References Cited

U.S. PATENT DOCUMENTS

| | | | | |
|---|---|---|---|---|
| 6,570,581 | B1* | 5/2003 | Smith | 345/632 |
| 6,988,069 | B2* | 1/2006 | Phillips | 704/258 |
| 7,117,174 | B2* | 10/2006 | Corvin | 705/36 R |
| 2001/0025255 | A1* | 9/2001 | Gaudian | 705/26 |
| 2005/0108081 | A1* | 5/2005 | Loe et al. | 705/10 |
| 2006/0161437 | A1* | 7/2006 | Akabane et al. | 704/260 |
| 2007/0198353 | A1* | 8/2007 | Behringer et al. | 705/14 |
| 2007/0214208 | A1* | 9/2007 | Balachandran | 709/201 |
| 2007/0294177 | A1* | 12/2007 | Volk et al. | 705/52 |
| 2008/0039010 | A1* | 2/2008 | Vance et al. | 455/3.06 |
| 2009/0177601 | A1* | 7/2009 | Huang et al. | 706/16 |

OTHER PUBLICATIONS

Lee, Stuart D., "Digitization: Is It Worth It?", May 2001, Computer Libraries, vol. 21. No. 5., 5 pgs.*
Lieberman et al., "ScanSoft: Dominance in a Growing Industry: Clearly a Buy", Apr. 4, 2004, Yale School of Management, 21 pages.*

* cited by examiner

*Primary Examiner* — John Hayes
*Assistant Examiner* — Freda A Nelson
(74) *Attorney, Agent, or Firm* — Toler Law Group, PC

(57) ABSTRACT

A particular method of distributing content includes receiving data related to content to be distributed. The method also includes automatically estimating a financial return associated with an audio version of the content based at least partially on a particular text-to-speech conversion process used to generate the audio version. The method further includes selecting one of a plurality of available text-to-speech conversion processes based on the estimated financial return.

21 Claims, 3 Drawing Sheets

SYSTEM AND METHOD OF DISTRIBUTING AUDIO CONTENT

FIELD OF THE DISCLOSURE

The present disclosure is generally related to computer networks and methods and systems to distribute audio content.

BACKGROUND

A significant amount of content is available via the Internet in a text format. More users may be able to access such content if it were available in an audio format. Supplying content that was prepared in a text format in an audio format can be expensive, time consuming, or both. Thus, content available for distribution in an audio format is limited.

DETAILED DESCRIPTION

Systems and methods to distribute audio content are provided. A particular system includes an interface to receive data related to content. The system also includes a finance module to estimate financial return associated with producing an audio version of the content based on a plurality of text-to-speech conversion processes. The system also includes a selection module to select a text-to-speech conversion process based at least partially on the estimated financial return.

A particular method includes receiving data related to content to be distributed. The method also includes automatically estimating a financial return associated with producing an audio version of the content based at least partially on a particular text-to-speech conversion process to be used to produce the audio version. For example, the data related to the content may be used to determine how much producing an audio version of the content will cost based on a cost model. The cost model may use information about the size of the content (e.g., a word count), the complexity of the content, the time dependence of the content, other information relevant to the cost of producing or distributing the audio version of the content, or any combination thereof. The cost model may also include pricing information useful to estimate the cost of producing an audio version of the content using a computerized text-to-speech process, using a human text reader, using another conversion process, or any combination thereof. The cost model may also include distribution cost information. For example, the cost model may include information about the cost of storing and serving the audio version of the content depending on the size of the audio version of the content. In another example, the cost model may include information about the cost of distributing the audio version of the content by placing automated calls to devices associated with subscribers to the content. The cost model may be used to analyze the information about the content, the pricing information and the distribution cost information, and to automatically estimate the financial return associated with the audio version of the content. The method further includes selecting one of a plurality of available text-to-speech conversion processes based on the estimated financial return.

Computer-readable media including instructions executable by a processor to distribute content are also provided. A particular computer-readable medium includes instructions that, when executed by a processor, cause the processor to receive data related to content. The computer-readable medium also includes instructions that, when executed by the processor, cause the processor to estimate a financial return associated with distributing an audio version of the content. The estimate of financial return is based at least partially on a text-to-speech conversion process to be used to generate the audio version of the content.

Figure 1:
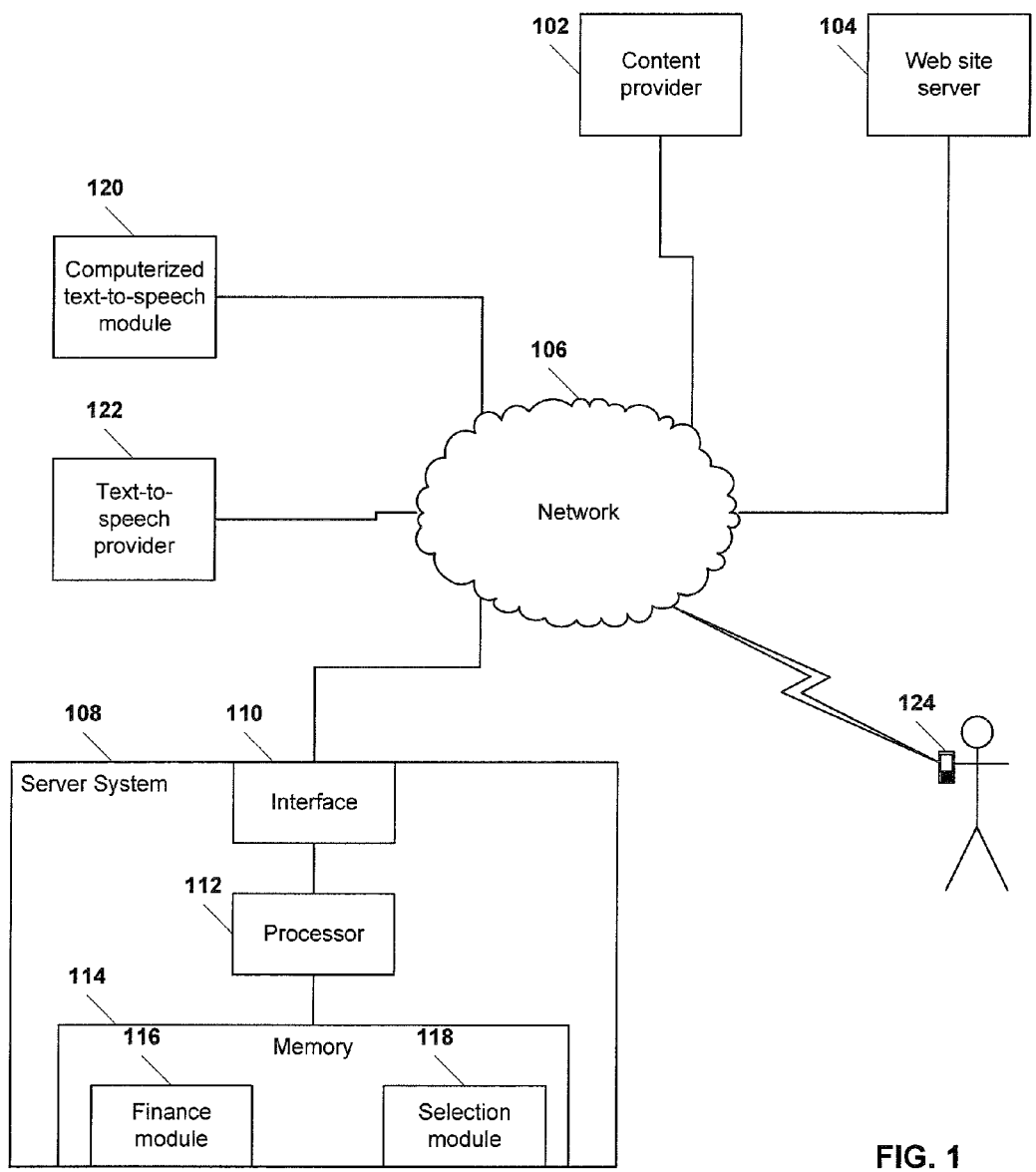
FIG. 1 is a block diagram of a particular embodiment of a system to distribute audio content.

Referring to FIG. 1, a particular embodiment of a system for distributing audio content is shown. The system includes a content provider 102 that makes content available via a network 106. The content can include news articles, search indices, informational articles, web logs (also called "blogs"), and a large variety of other informational or entertainment content. In a particular embodiment, the content includes text or multimedia content.

The system also includes a website server 104. The website server 104 is associated with a network address such as a universal resource locator (URL) of a particular website. The website server 104 may be adapted to serve information provided by the content provider 102 via the network 106 to one or more users, such as a representative user 124.

The system also includes a server system 108. The server system 108 is adapted to receive data related to content to be distributed, to estimate financial return associated with distributing an audio version of the content, and to select a text-to-speech conversion process based on the estimated financial return. For example, the server system 108 may include an interface 110 to receive data related to content to be published. The data related to the content can include the content itself, descriptive information about the content, information about the expected distribution of the content, other information about the content, the content provider 102, or a content publisher, or any combination thereof. To illustrate, the data may include historical information such as historical distribution of the content, or historical distribution of related or similar content. The data may be provided by the content provider 102, the website server 104, another source, or any combination thereof.

The server system 108 also includes a processor 112 and a memory 114 accessible to the processor. The memory 114 may include one or more modules adapted to implement various functions of the server system 108. The modules may be implemented in hardware, software executable by the processor 112, or any combination thereof. Further, while a single server system 108 is illustrated, the term "system" includes any collection of systems or sub-systems that individually or jointly execute a set, or multiple sets, of instructions to perform one or more computer executable functions of the server system 108.

In a particular embodiment, the memory 114 includes a finance module 116 and a selection module 118. The finance module 116 is adapted to estimate financial return associated with distributing audio versions of the content based on use of the plurality of text-to-speech conversion processes. For example, the financial return may be estimated based on a number of users likely to access the content. The number of users likely to access the content can include those likely to access an audio version of the content, those likely to access an original version (e.g., text or multimedia version) of the content, or both. The estimated financial return can also be determined based on an advertising pricing model associated with the content. For example, the advertising pricing model may specify how a content provider, web site, or other content distributor is to be paid for distributing advertisements associated with the content. To illustrate, in a particular advertising pricing model, a content distributor may be paid on a per-view model. That is, the content distributor may be paid a specific amount for presenting an advertisement to a particular number of users. In another advertising pricing model, the content distributor may be paid on a per-click basis. That is, the content distributor may be paid for each user that selects the advertisement to access additional information about an advertised product or service. In yet another advertising pricing model, the content distributor may be paid on a per-sale or per-conversion basis. That is, the content distributor may be paid each time a user makes a purchase or other transaction that can be traced to the advertisement. Other advertising pricing models may also be used.

The estimated financial return may also be determined based on historical distribution of similar or related content. To illustrate, where the content includes a blog, the average number of people who visit the blog or a related website each day or when a new entry is posted may be used as an estimate of the distribution of a new entry to the blog. In another illustration, other metrics may be used to estimate the distribution or popularity of the content. For example, the distribution of the content may be estimated based at least partially on the subject matter of the content. For example, certain news articles may be more popular than others due to the subject matter of the article and whether the subject matter has broad or narrow appeal. To illustrate, a news story about a small town little league baseball team's victory may be less popular than a story about the final game of the World Series because of the more limited regional appeal of the little league game as compared to the larger audience for the World Series.

The selection module 118 is adapted to select a text-to-speech conversion process based at least partially on the estimated financial return. For example, the selection module 118 may select between a computerized text-to-speech conversion process, such as may be implemented by a computerized text-to-speech module 120, and a text-to-speech conversion process provided by a text-to-speech provider 122. In a particular embodiment, the text-to-speech provider 122 may use one or more human text readers, such as professional voice actors, to read the content to generate an audio version of the content. In another particular embodiment, the text-to-speech provider 122 may use a more accurate or more lifelike computerized text-to-speech process than the computerized text-to-speech module 120. In yet another embodiment, the text-to-speech provider 122 may generate a voice translation of the content into a language other than the original language of the content.

In a particular embodiment, the server system 108 is adapted to store a record associated with the content indicating that a particular text-to-speech process, e.g., the computerized text-to-speech module 120 or the text-to-speech provider 122, should be used to generate an audio version of the content. The server system 108 may also send an indication that a particular text-to-speech process has been selected to a service provider, such as to the text-to-speech provider 122, to authorize generation of the audio version of the content using the selected text-to-speech process.

In a particular embodiment, the audio version of the content may be posted for distribution along with the content at the website server 104. In another particular embodiment, the audio version of the content may be distributed to one or more users, such as the representative user 124, directly via the network 106. For example, a distribution list associated with the content may include telephone numbers associated with subscribers to the content, and the audio version of the content may be distributed via automated telephone calls to the subscribers.

Figure 2:
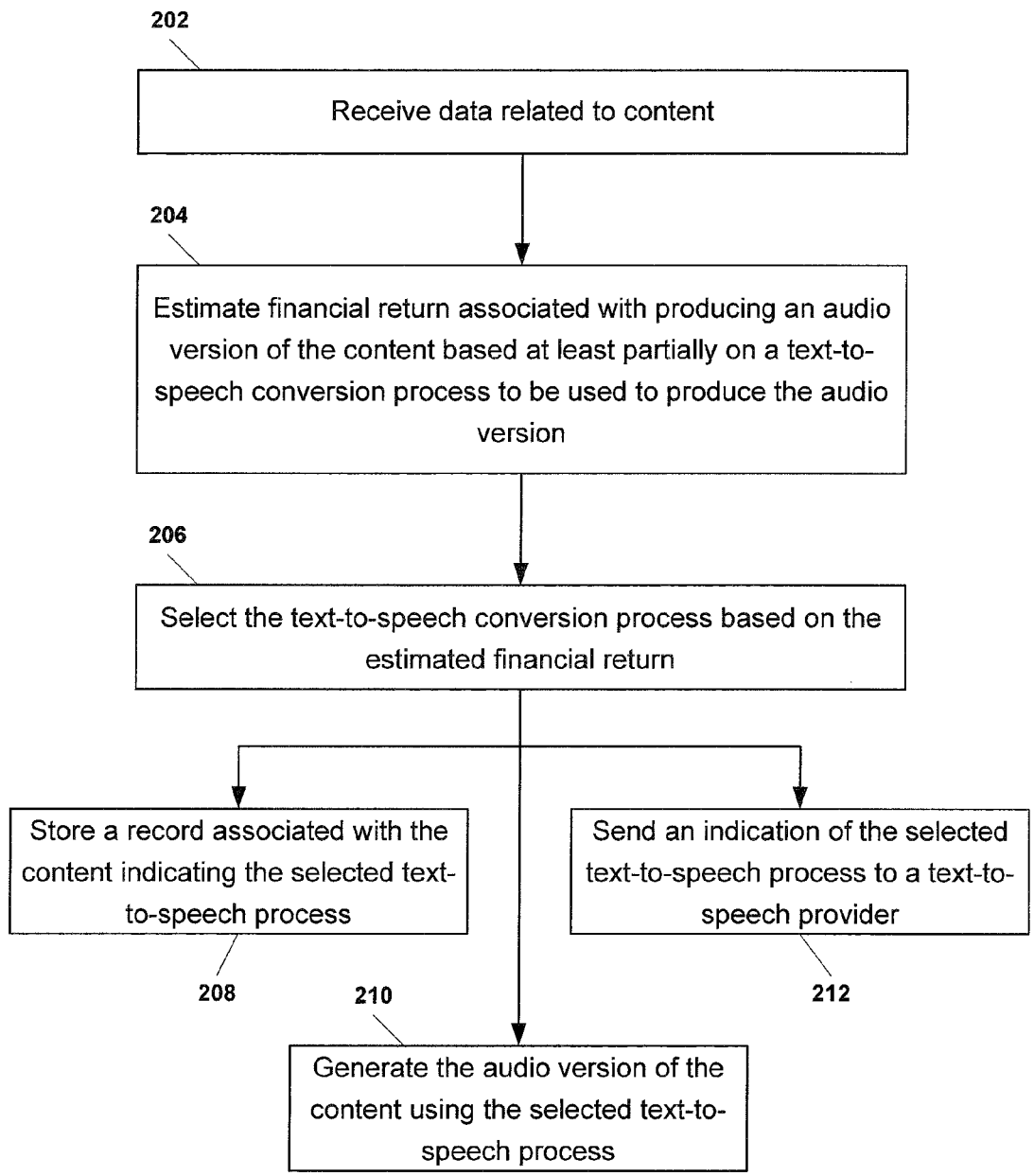
FIG. 2 is a flow chart of a particular embodiment of a method of distributing audio content.

Referring to FIG. 2, a first particular embodiment of a method of distributing content is illustrated. The method includes, at 202, receiving data related to content to be distributed. The content may include time relevant content, such as a news article; non-time relevant content, such as an informational article or an article associated with an encyclopedia; or both. The data received may include the content in a text format and additional data used to estimate financial return associated with the content. Examples of information that can be used to estimate financial return associated with the content can include, but are not limited to: a number of subscribers associated with the content, a historical distribution related to the content, a size of a distribution list associated with the content, other data or metrics related to the popularity of the content, or any combination thereof.

The method also includes, at 204, estimating financial return associated with distributing an audio version of the content. The estimate of financial return may be based at least partially on a text-to-speech conversion process used to generate the audio version. For example, the estimate of financial return may consider the cost of generating an audio version of the content using a computerized text-to-speech process, the cost of generating an audio version of the content using a human text reader, such as a voice actor, or both. The estimate of financial return may also be based at least partially on a projection of the number of users likely to access the content, in a text format, in an audio format, or both. The estimate of financial return may also be based at least partially on information about the number of users likely to access an audio version of the content if the audio version is generated by an automated text-to-speech conversion process and the number of users likely to access the audio version of the content if a higher quality text-to-speech conversion process is used, such as a higher quality computerized text-to-speech process or a human process using a voice actor. For example, a higher quality audio version of the content may appeal to more users than a lower quality audio version of the content.

In a particular embodiment, the estimate of financial return may also be based at least partially on an estimate of the number of users likely to access the audio version of the content depending on when the audio version is made available. For example, time dependent content may be accessed by more users if it is available relatively quickly. To illustrate, a breaking news story with incomplete details may be of interest to many users immediately after the story becomes available. However, as additional news stories become available that include more details, an audio version of the breaking news story may be of interest to fewer users.

The estimate of financial return may also be based at least partially on an advertising pricing model associated with the content. For example, the content may be associated with a particular website that has an advertising pricing model based on an agreement with advertising providers. The advertising pricing model of the website may be used to determine projected return associated with publishing an audio version of the content. The advertising pricing model can include per-click pricing, per-view pricing, per-sale pricing, another price structure, or any combination thereof.

The method also includes, at 206, selecting a text-to-speech conversion process based at least partially on the estimated financial return. For example, a text-to-speech conversion process associated with a human text reader, such as a voice actor, may be selected when the cost of producing the audio version using the human text reader is projected to be less than the estimated income from distributing the audio version of the content. In another example, a computerized text-to-speech conversion process may be selected when the cost of generating the audio version using a human text reader is greater than the estimated income from distributing the audio version of the content. In a particular embodiment, other costs of producing or distributing the audio version may also be considered. For example, costs associated with distributing the audio version of the content to users (e.g., costs associated with bandwidth, automated calls to subscriber devices, infrastructure and data storage, etc.) may be considered to determine whether an audio version of the content should be produced, and an audio conversion process to be used.

In another example, the computerized text-to-speech conversion process may also be selected when a time constraint to provide a human text reader version of the audio content would prohibit distribution of the content in a timely manner. In a particular embodiment, when estimated return depends on prompt distribution of the audio version of the content, an automated text-to-speech conversion process may be used to generate an initial audio version of the content and a subsequent human text reader version of the content may be provided as time allows so that a higher quality version of the audio content is available later.

After a text-to-speech conversion process is selected, the method may include, at 208, storing a record associated with the content that indicates the selected text-to-speech process. In a particular embodiment, the method includes, at 210, generating the audio version of the content using the selected text-to-speech process. In another particular embodiment, the method includes, at 212, sending an indication of the selected text-to-speech process to a text-to-speech provider or to a computerized text-to-speech module.

Figure 3:
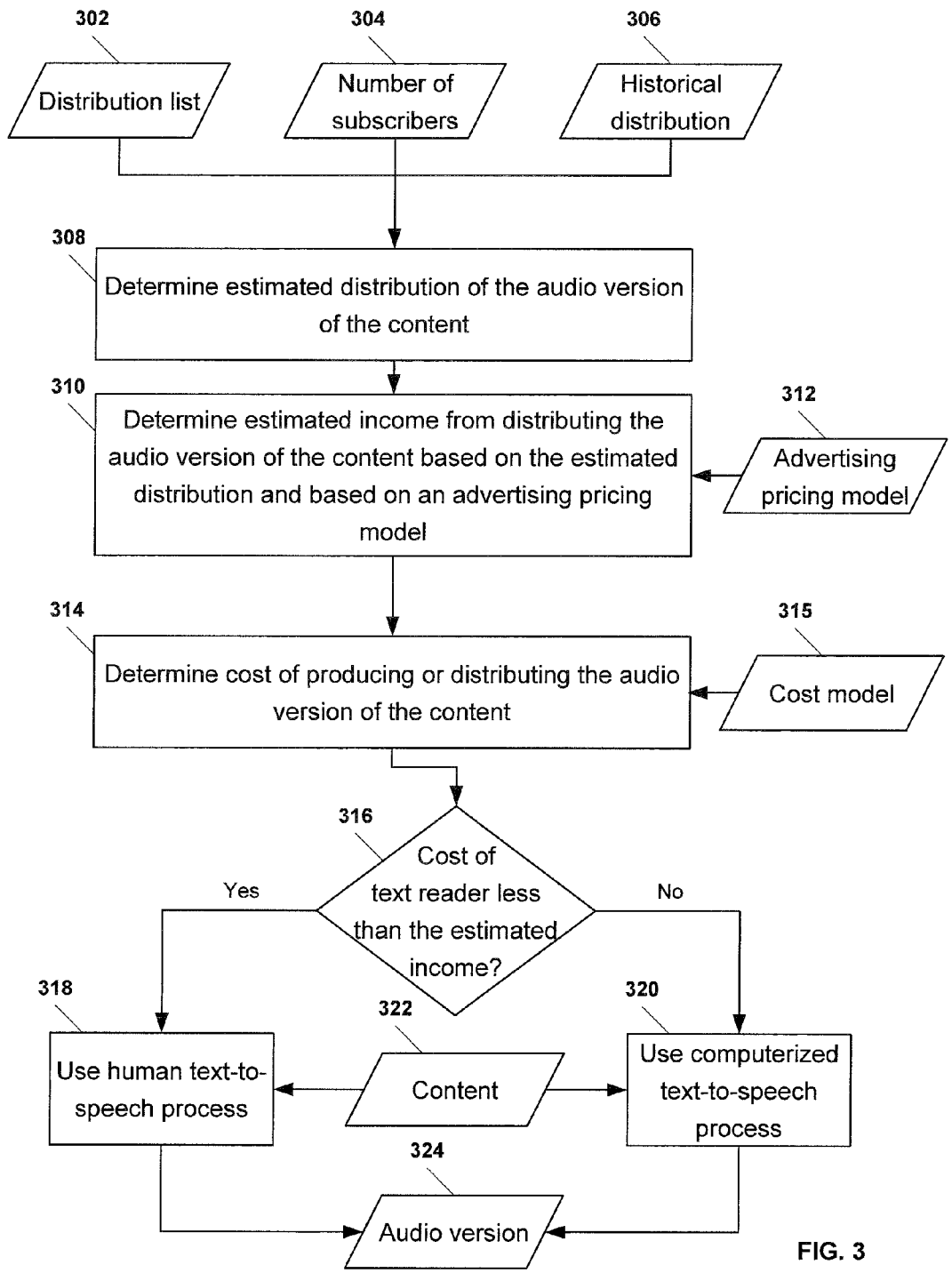
FIG. 3 is a flow chart of a second particular embodiment of a method of distributing audio content.

FIG. 3 depicts a second particular embodiment of a method of distributing audio content. The method includes, at 308, determining an estimated distribution of an audio version 324 of particular content 322. The estimated distribution of the audio version 324 of the content 322 may be determined based on a distribution list 302 associated with the content 322, a number 304 of subscribers associated with the content 322, historical distribution 306 of similar or related content, other information useful to estimate a number of users likely to access the audio version 324 of the content 322, or any combination thereof. For example, where the content 322 includes a news story, information related to historical access to similar news stories may be used to determine an estimate of the distribution of the audio version 324 of the content 322. In another example, where the content 322 includes a blog entry, a number of subscribers to the blog may be assessed to determine an estimate of the likely distribution of the audio version 324 of the content 322. In yet another example, where the content 322 is associated with a distribution list 302, the size of the distribution list 302 may be used to determine an estimate of the likely distribution of the audio version 324 of the content 322.

The method also includes, at 310, determining estimated income from distributing the audio version 324 of the content 322 based at least partially on the estimated distribution and based at least partially on an advertising pricing model 312. In a particular embodiment, the advertising pricing model 312 may be associated with a text version of the content 322, the audio version 324 of the content 322, or any combination thereof. For example, a website associated with the text version of the content 322 may generate revenue through advertising. The advertising pricing model associated with the website may be used to determine an estimated income from distribution of the audio version 324 of the content 322 based on increased access to the content by users accessing the audio version.

In another particular embodiment, the advertising pricing model 312 may be associated with the audio version 324 of the content 322. For example, certain advertisers may advertise using the audio version 324 of the content 322 that do not advertise using the text version of the content 322. To illustrate, advertisers targeting mobile communication devices, such as mobile telephones, may find that advertising using the audio version 324 of the content 322 is better directed to their target market. In a further illustration, the advertising pricing model associated with the audio version 324 of the content 322 may target advertising to users of mobile devices based on the location of the mobile device. For example, a Global Positioning System (GPS) receiver in a mobile telephone may send location information related to the location of the mobile telephone while accessing the audio version 324 of the content 322. The location information may be used to select an advertisement to send with the audio version 324 of the content 322 to the mobile telephone. The advertiser may pay for the advertising based at least partially on the location of the mobile telephone relative to a target location, such as a distance to a particular store location.

The method also includes, at 314, determining the cost of producing or distributing the audio version 324 of the content 322. In a particular embodiment, the cost may be automatically estimated using a cost model 315. In a particular illustrative embodiment, the cost estimated may include the cost of generating the audio version 324 of the content 322 using a human text reader, the cost of generating the audio version 324 of the content 322 using a computerized text-to-speech process, the cost of storing and distributing the audio version 324 of the content 322, other costs associated with producing or distributing the audio version 324 of the content 322, or any combination thereof. To illustrate, the cost of generating the audio version 324 of the content 322 may be estimated based on a type of the content 322, a size of the content 322 (e.g., a word count), another metric used by a text-to-speech service provider to price conversion of the content to an audio format (e.g., a flat rate), or any combination thereof.

The method also includes, at 316, determining whether the cost of generating the audio version 324 of the content 322 using the human text reader is less than the estimated income. When the cost of generating the audio version 324 of the content 322 using the human text reader is less than the estimated income, the method includes, at 318, using the human text-to-speech conversion process, e.g., selecting the human text-to-speech process to generate the audio version 324 of the content 322. When the cost of generating the audio version 324 of the content 322 using the human text reader is not less than the estimated income, the method includes, at 320, using a computerized text-to-speech conversion process to generate the audio version 324 of the content 322.

In a particular embodiment, when the cost of generating the audio version 324 of the content 322 is greater than the estimated income regardless of the conversion process used, the method 300 may select not to generate the audio version 324 of the content 322. In another particular embodiment, a safety threshold may be considered when determining whether to produce the audio version 324 of the content 322 or which process to use to produce the audio version 324 of the content 322. For example, the safety threshold may include a particular portion (e.g., a percentage) of the expected cost, revenue or income of producing the audio version 324 of the content. In another example, the safety threshold may include a fixed monetary amount. The audio version 324 of the content 322 may be produced when the cost of producing the audio version 324 of the content 322 is less than the expected revenue from distribution of the audio version 324 of the content 322 by at least the safety threshold.

In a particular embodiment, an audio version of content generated by a human text reader may sound more natural than an audio version of the content generated using a computerized process. However, generating an audio version of the content using a human text reader can be more expensive in terms of cost and in terms of time required to generate the audio version of the content. The systems and methods described herein can utilize estimates of income that could result from an audio version of the content to estimate whether generating an audio version of the content using a human text reader would be desirable or profitable and whether the audio version of the content can be provided in timely manner.

In a particular embodiment, a process of determining how to generate an audio version of particular content would be transparent to a content provider. That is, the content provider would not be burdened with determining whether to use a human text reader or an automated text-to-speech conversion process to generate an audio version of the content. Additionally, generating the audio version of the content may be done in a manner that does not negatively impact the potential audience for the distribution. For example, an estimate of income from distribution of the audio version may account for reductions of the potential audience size for the audio version as a result of delays from using human text-to-speech conversion rather than a computerized text-to-speech process.

Historical data, real-time data, or both may be evaluated to estimate distribution of the audio version of the content. For example, a distribution list including telephone numbers of subscribers to audio versions of particular content can be used to determine a predicted distribution of the audio content. A pricing model associated with advertising related to the content, a category of the content or a publisher of the content can be used to estimate an initial projected revenue value for the content. The projected revenue can be compared to the projected production costs for converting the content to an audio format based on a word count or other measures of complexity for pricing models to determine whether distribution of the audio version of the content would be profitable and to determine a particular method of generating the audio content that would generate the most profitable returns. Such an analysis may take into account that a computerized text-to-speech version of the content may be less appealing to certain subscribers and, therefore, have a reduced distribution or reduced advertising response. Thus, the balance between generating a higher quality version of the audio content using a human text reader and generating a lower cost version of the audio content using a computerized text-to-speech process may be considered in determining which process would be more profitable.

In a particular embodiment, dedicated hardware, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules. Accordingly, the present systems encompass software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions executable by a processor. While the computer-readable medium may be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding or tangibly carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered equivalent to a tangible storage medium. Accordingly, the disclosure is considered to include any one or more of a computer-readable medium or other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a processor, data related to content;
   automatically estimating, at the processor, a first cost associated with producing a first audio version of the content using a first text-to-speech conversion process, wherein automatically estimating the first cost associated with producing the first audio version of the content includes estimating a cost of using a human to read the content;
   automatically estimating, at the processor, a first expected revenue amount from distribution of the first audio version of the content, wherein automatically estimating the first expected revenue amount from distribution of the first audio version of the content includes accounting for a reduction in a potential audience size as a result of a delay associated with using the human to read the content rather than using a computerized text-to-speech conversion process; and
   automatically determining, at the processor, whether to produce the first audio version of the content using the first text-to-speech conversion process based at least partially on whether the first expected revenue amount from distribution of the first audio version of the content exceeds the first cost associated with producing the first audio version of the content using the first text-to-speech conversion process.

2. The method of claim 1, wherein automatically estimating the first expected revenue amount comprises:
   determining an estimated distribution of the first audio version of the content; and
   determining an estimated income from distributing the first audio version of the content based on the estimated distribution and based on an advertising pricing model.

3. The method of claim 2, wherein the first text-to-speech conversion process is selected to produce the first audio version of the content when the first cost is less than the estimated first expected revenue amount, and wherein the computerized text-to-speech conversion process is selected to produce a second audio version of the content when the first cost is not less than the estimated first expected revenue amount.

4. The method of claim 3, wherein a voice actor is used to produce the first audio version of the content.

5. The method of claim 1, wherein automatically estimating the first cost further includes estimating a cost of using the computerized text-to-speech conversion process to produce the first audio version of the content.

6. The method of claim 1, further comprising generating the first audio version of the content using the first text-to-speech conversion process when the first expected revenue amount exceeds the first cost.

7. The method of claim 1, wherein the first expected revenue amount is estimated based at least partially on an estimated distribution of the content.

8. The method of claim 7, wherein the estimated distribution is determined based at least partially on a number of subscribers associated with the content.

9. The method of claim 7, wherein the estimated distribution is determined based at least partially on a historical distribution of related content.

10. The method of claim 7, wherein the content is associated with a distribution list, and wherein the estimated distribution is determined based at least partially on a size of the distribution list.

11. The method of claim 1, wherein the estimated first expected revenue amount is further based on an evaluation of an advertising pricing model associated with the content.

12. The method of claim 11, wherein the content is associated with a website, and wherein the advertising pricing model is associated with the website.

13. The method of claim 1, further comprising:
   automatically estimating a second cost associated with producing a second audio version of the content using a second text-to-speech conversion process in response to determining that the first cost exceeds the first expected revenue amount; and
   automatically estimating a second expected revenue amount from distribution of the second audio version of the content,
   wherein the second audio version of the content is produced using the second text-to-speech conversion process in response to determining that the second expected revenue amount exceeds the second cost, and
   wherein the second audio version of the content is not produced using the second text-to-speech conversion process in response to determining that the second cost exceeds the second expected revenue amount.

14. The method of claim 1, further comprising:
   automatically determining whether the first cost is less than the first expected revenue amount by at least a safety threshold; and
   in response to determining that the first cost is less than the first expected revenue amount by at least the safety threshold, producing the first audio version of the content using the first text-to-speech conversion process.

15. The method of claim 2, wherein the estimated distribution of the first audio version of the content includes a first number of users that are likely to access the first audio version of the content when the first audio version of the content is generated using a computerized text-to-speech conversion process.

16. The method of claim 15, wherein the first number of users is different from a second number of users that are likely to access a second audio version of the content that is generated using a different text-to-speech conversion process, wherein the different text-to-speech conversion process includes one of a higher quality computerized text-to-speech conversion process and a human text-to-speech conversion process that uses a voice actor.

17. A system, comprising:
   a processor;
   an interface to receive data related to content;

a finance module, executable by the processor, to:
   estimate a cost associated with producing an audio version of the content using a particular text-to-speech conversion process, wherein estimating the cost associated with producing the audio version of the content includes estimating a cost of using a human to read the content; and
   estimate an expected revenue amount from distribution of the audio version of the content, wherein estimating the expected revenue amount from distribution of the audio version of the content includes accounting for a reduction in a potential audience size as a result of a delay associated with using the human to read the content rather than using a computerized text-to-speech conversion process; and
a selection module, executable by the processor, to select the particular text-to-speech conversion process to produce the audio version of the content when the expected revenue amount from distribution of the audio version of the content exceeds the cost associated with producing the audio version of the content using the particular text-to-speech conversion process.

18. The system of claim 17, wherein the finance module is further executable by the processor to estimate a distribution of the audio version of the content based at least partially on the particular text-to-speech conversion process used to generate the audio version of the content, and wherein the expected revenue amount from distribution of the audio version of the content is determined based at least in part on the estimated distribution.

19. The system of claim 17, wherein the finance module is further executable by the processor to:
   estimate a second cost associated with producing a second audio version of the content using a second text-to-speech conversion process in response to determining that the cost associated with producing the audio version of the content using the particular text-to-speech conversion process exceeds the expected revenue amount; and
   automatically estimating a second expected revenue amount from distribution of the second audio version of the content,
   wherein the selection module is further executable by the processor to select the second text-to-speech conversion process to produce the second audio version of the content in response to determining that the second expected revenue amount exceeds the second cost, and wherein the second audio version of the content is not selected by the selection module to produce the second audio content in response to determining that the second cost exceeds the second expected revenue amount.

20. A non-transitory computer-readable storage medium, comprising:
   instructions that, when executed by a processor, cause the processor to receive data related to content;
   instructions that, when executed by the processor, cause the processor to estimate a cost associated with producing an audio version of the content using a particular text-to-speech conversion process, wherein the estimation of the cost associated with producing the audio version of the content includes an estimate of a cost of using a human to read the content;
   instructions that, when executed by the processor, cause the processor to estimate an expected revenue amount from distribution of the audio version of the content, wherein the estimation of the expected revenue amount accounts for a reduction in a potential audience size as a result of a delay associated with using the human to read the content rather than using a computerized text-to-speech conversion process; and
   instructions that, when executed by the processor, cause the processor to determine whether to produce the audio version of the content based at least partially on whether the expected revenue amount from distribution of the audio version of the content exceeds the cost associated with producing the audio version of the content using the particular text-to-speech conversion process.

21. The non-transitory computer-readable medium of claim 20, further comprising:
   instructions that, when executed by the processor, cause the processor to estimate a second cost associated with producing a second audio version of the content using a second text-to-speech conversion process in response to determining that the first cost exceeds the first expected revenue amount; and
   instructions that, when executed by the processor, cause the processor to estimate a second expected revenue amount from distribution of the second audio version of the content,
   wherein the second audio version of the content is produced using the second text-to-speech conversion process in response to determining that the second expected revenue amount exceeds the second cost, and wherein the second audio version of the content is not produced using the second text-to-speech conversion process in response to determining that the second cost exceeds the second expected revenue amount.

* * * * *